(12) United States Patent
Naples

(10) Patent No.: US 6,390,257 B1
(45) Date of Patent: May 21, 2002

(54) SUSPENSION DAMPER HAVING PISTON PLATE WITH COINED, CONTINUOUSLY CURVED BYPASS

(75) Inventor: Mark R. Naples, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/505,130

(22) Filed: Feb. 16, 2000

(51) Int. Cl.$^7$ .................................................. F16F 9/52
(52) U.S. Cl. ............... 188/322.15; 188/281; 188/282.5; 188/282.6
(58) Field of Search .............................. 188/322.15, 28, 188/282.5, 282.6

(56) References Cited

U.S. PATENT DOCUMENTS

| | | | |
|---|---|---|---|
| 4,685,545 A | * 8/1987 | Fannin et al. | 188/322.15 |
| 4,905,799 A | * 3/1990 | Yamaoka et al. | 188/322.15 |
| 5,738,190 A | * 4/1998 | DeFerme | 188/322.15 |
| 5,769,192 A | * 6/1998 | Beck | 188/322.15 |

* cited by examiner

Primary Examiner—Matthew C. Graham
(74) Attorney, Agent, or Firm—Robert M. Sigler

(57) ABSTRACT

A suspension damper or shock absorber for a vehicle suspension system includes a piston assembly across which damping fluid is metered to control relative movement between the vehicle body and chassis. The piston assembly includes a piston plate in which a first set of openings are provided for fluid communication during the rebound stroke of the piston assembly and a second set of openings for communication of damping fluid during the opposite compression stroke. A wall circumscribes the first set of openings to define a recess receiving damping fluid from the first set of openings. A valve disc engages the wall and opens at a predetermined pressure differential. At pressure differentials less than the predetermined pressure differential, highly restricted flow is permitted through a bypass passage formed by a coined depression in the rim of the wall having a continuously curved, preferably semicircular cross section, to provide damping for low level inputs. The curved shape of the bypass passage reduces wear and tear on the coining tooling and also reduces turbulence in fluid flow for greater consistency in flow characteristics.

11 Claims, 2 Drawing Sheets

SUSPENSION DAMPER HAVING PISTON PLATE WITH COINED, CONTINUOUSLY CURVED BYPASS

TECHNICAL FIELD

This invention relates to a suspension damper for dampening relative movement in the suspension system of a vehicle.

BACKGROUND OF THE INVENTION

Modern motor vehicles have suspension systems which include suspension dampers or shock absorbers to control the relative movements of the vehicle chassis with respect to the vehicle body. These dampers commonly include a cylindrical housing and a piston assembly slidably mounted within the cylindrical housing. The cylindrical housing is commonly connected to a vehicle wheel end assembly. The piston assembly includes a piston rod which extends from the cylindrical housing and is connected to the vehicle body, and a piston plate which has two sets of apertures extending therethrough. Valve discs control communication through the apertures, permitting communication through one set of apertures during the compression strokes and through the other set of apertures during the rebound stroke. During the rebound stroke, only highly restricted communication is permitted through a bypass passage until the pressure differential across the piston is sufficient to cause the corresponding valve disc to open.

Prior art bypass passages are of two basic designs. The first is a slotted disc design in which the valve disc has a slot extending radially across the valve seat so as to allow some fluid to escape over the portion of the valve seat not covered by the disc. The other is a design in which an opening is made in the top of the wall defining the seat by coining a rectangular depression in the valve seat at the top of the wall to allow some fluid to flow through the opening under the seated valve disc. The latter design is potentially less expensive due to the simplicity of the coining process; but it has not been as successful as anticipated due to the wear and tear on the tooling creating the coined opening, which can cause inconsistency in the coined opening as well as additional manufacturing expense. In addition to being difficult to manufacture consistently, these prior art rectangular bypass passages cause turbulence which makes fluid flow through the bypass passage difficult to control and causes considerable performance variation.

SUMMARY OF THE INVENTION

According to the present invention, the required bypass passage is a continuously curved, preferably semicircular, coined depression in the rim of the wall forming a recess communicating the openings through which damping fluid flows through the piston plate, the rim forming a seat for a valve disc with the valve in its closed position. The semicircular configuration is easier to consistently fabricate with less wear on tooling as compared to the prior art rectangular coined depressions forming bypass passages. The semicircular shape also reduces turbulence in the flow of the damping fluid through the bypass passage, resulting in a controlled fluid flow and less variation in the performance of the valve discs.

DESCRIPTION OF THE PREFERRED EMBODIMENT

Figure 1:
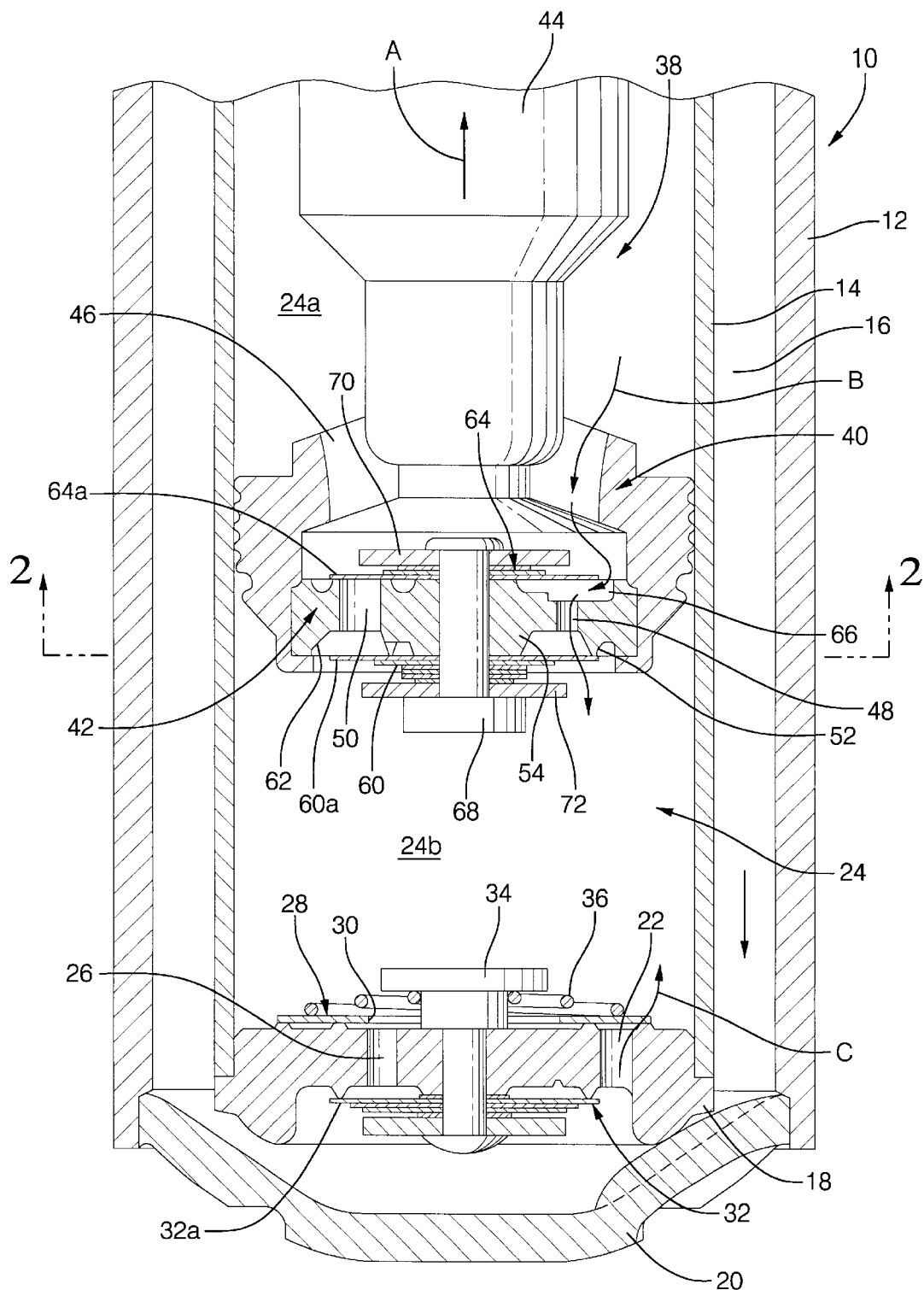
FIG. 1 is a fragmentary, cross-sectional view of a suspension damper made pursuant to the teachings of the present invention.
Figure 2:
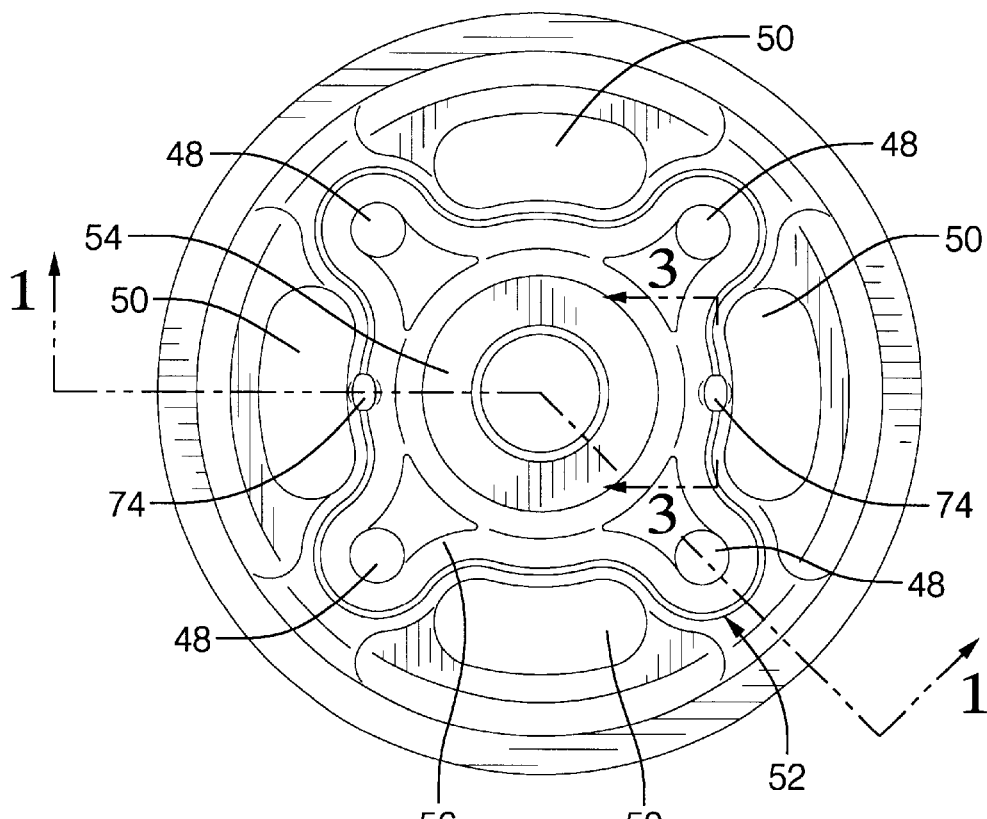
FIG. 2 is an enlarged end view taken substantially along lines 2—2 of FIG. 1.

Referring now to the drawings, a suspension damper or shock absorber is generally indicated by numeral 10 and includes an outer tubular housing indicated by 12 and an inner tubular housing indicated by 14. Housings 12,14 cooperate to define a damping fluid reservoir 16 therebetween. The lower end of inner housing 14 is closed by a base plate assembly generally indicated by numeral 18, and the lower end of the outer housing 12 is closed by closure 20. The base plate assembly 18 includes one or more openings 22 for communicating damping fluid from the reservoir 16 into the chamber 24 defined by the inner housing 14 and one or more openings 26 for communicating fluid from the chamber 24 into the reservoir 16. A conventional valve assembly consists of an annular valve disc 28, which controls the flow of fluid from reservoir 16 into chamber 24 and defines a central opening at 30 that permits damping fluid to communicate from the chamber 24 into openings 26, and a set of lower valve discs 32 to control the communication from the passages 26 into the reservoir 16. The set of valve discs 32 includes a valve disc 32a which engages the base plate 18 to control communication through openings 26. A rivet 34 secures the valve discs 28, 32 to the base plate 28 in a conventional manner. A spring 36 biases the valve disc 28 to a position closing the openings 22. The pressure differential required to cause communication through the passages 26 is controlled by the number and shape of the discs 32, in a manner well known to those skilled in the art.

Figure 3:
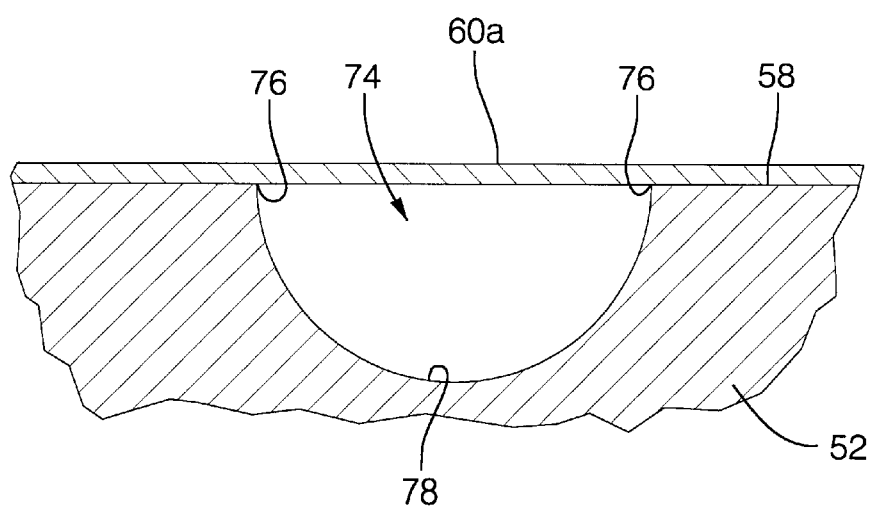
FIG. 3 as an enlarged cross-sectional view taken substantially along lines 3—3 of FIG. 2.

A piston assembly generally indicated by the numeral 38 divides the chamber 24 into a chamber 24a and a chamber 24b. The piston assembly 38 includes a head 40 which is slidably and sealingly engaged with the wall of the inner tubular housing 14. The head 40 carries a piston plate 42, which will be described in detail hereinafter. A piston rod 44 extends upwardly (viewing FIG. 1) from the head 40 through the chamber 24a. The rod 44 extends through a sealed opening (not shown) in the compression chamber 24 and is conventionally attached to a portion of the body of the motor vehicle upon which the damper 10 is used. The housing 12 is attached to a wheel assembly (not shown) of the vehicle. As will be understood by those skilled in the art, the housing 14 is free to move relative to the piston assembly 38 in response to movements of the wheel assembly, and the piston assembly 38 is free to move within the housing 14 (secured to outer housing 12) in response to movement of the vehicle body. Accordingly, the chamber 24a is a sealed chamber, and fluid is communicated into or out of the chamber 24a in general only through the piston plate 42, as will hereinafter be described. Accordingly, relative movement of the piston with respect to the housing in the direction of the arrow A (which may be a result of upward movement of the piston or downward movement of the housing) is referred to herein as movement of the piston in the rebound direction, and relative movement of the piston in the opposite direction(which may be a result of downward movement of the piston or upward movement of the housing) is referred to herein as movement of the piston in the compression direction. The piston head 40 is provided with large openings 46, to permit communication of damping fluid to the piston plate The piston plate 42 includes a first set of openings 48 and a second set of openings 50, which extend through the piston plate 42. The side of the piston plate 42 facing the base plate 18 includes a wall 52 that extends around each of the openings 48 and circumscribes the hub portion 54 of the piston plate to define a recess 56 that communicates each of the openings 48 with all of the other openings 48. The outer edge of the wall 52 terminates in a rim 58 (FIG. 3). A first set of valve discs 60 includes a valve disc 60a that is of sufficient diameter to engage the rim 58 and thus prevent communication of damping fluid over the rim 58. However, each of the openings 50 includes an offset portion 62 extending radially outwardly from the openings 50 a distance extending beyond the diameter of the disc 60a engaging the rim 58, so that fluid may communicate from chamber 24b into the openings 50. A second set of valve discs 64 includes a disc 64a extending across the hub 54 and the second set of openings 50, but is of insufficient diameter to extend completely across an offset portion 66 of each opening 48. The valve discs 60, 64 are retained on the piston plate 40 by a conventional rivet 68 and retainers 70, 72. As is well know to those skilled in the art, the number and relative size of the discs and retainers, and the design of the rivet 68 holding them in place, are all chosen to permit the valve discs 60a and 64a closing the passages 48, 50 to deflect at a predetermined pressure differential, to then permit communication of damping fluid across the piston plate 40, in a manner well known to those skilled in the art.

According to the invention, during movement of the piston assembly 38 in the rebound direction, highly restricted flow of fluid is permitted across the piston plate 40 through one or more semicircular bypass passages generally indicated by the numeral 74 defined in the wall 52 to provide damping for low level inputs. As shown in FIG. 3, the rim 58 is interrupted at corners 76, which are connected by a semicircular surface generally indicated at 78. Although a semicircular surface is shown, other arcuate or continuously curved surfaces may be used to provide the advantages of the invention of reducing turbulence of the flow through the bypass passage for better controlled fluid flow.

In operation, upon relative movement between the piston assembly 38 and the housing 12 in which the piston assembly 38 moves into the compression chamber 24a in the direction indicated by the arrow A, damping fluid is forced from the chamber 24a into the chamber 24b along the path indicated by the arrow B. Accordingly, damping fluid flows through the openings 48 and through the bypass passages 74 as long as the valve disc 60a remains engaged with the rim 58. The highly restricted communication of damping fluid through the bypass passages provides damping for low level vibratory inputs. At the same time, damping fluid is drawn from the reservoir 16 through the openings 22 to compensate the volume of fluid in the chamber 24a for the increase in volume due to the relative movement of the housing and piston assembly which is not supplied by the flow through the bypass passages. When the pressure differential between the chamber 24b and the reservoir exceeds the force applied to the valve disc 30 by the spring 36, valve disc 30 deflects to allow communication of damping fluid into the chamber 24b from the reservoir 16. If the pressure differential across the piston plate 42 increases to a level sufficient to deflect the valve disc 60a, relatively uninhibited communication (as compared to the communication permitted by bypass flow only) is permitted from the chamber 24a into the chamber 24b.

During the compression stroke in which the relative movement between the piston assembly and the housing is such that the piston assembly 38 moves in the direction decreasing the volume of the chamber 24b, damping fluid flows through the openings 50 to deflect the valve disc 64a, and then into the chamber 24a. To compensate for the decreased volume of the chamber 24 due to the increased volume of the piston assembly 38 (including rod 44) received within the chamber 24, damping fluid is forced back into the reservoir 16 through the central opening 30 and the openings 26, the valve disc 32a having been deflected by the pressure differential between the chamber 24b and the reservoir 16.

In manufacture, semicircular bypass passage 74 is preferably formed by a coining process and causes less wear and tear on tooling than the rectangular coined bypass of the prior art. The coining operation is performed downwardly on rim 58 of wall 52 with a curved tool so as to deform the wall and thus form the depressed semicircular surface 78 that, together with disc 60a, defines bypass passage 74

What is claimed is:

1. Suspension damper for an automotive suspension system comprising a housing filled with damping fluid, a piston assembly slidable within said housing, said housing and said piston assembly being movable relative to one another in a rebound direction and in a compression direction, said piston assembly including a piston plate having a first set of openings, a wall defining a recess communicating said first set of openings with one another and terminating in a rim, a second set of openings, a first valve assembly including a valve disc movable between a closed condition engaging said rim to close said first set of openings and an open condition at least partially disengaged from said rim to open said first set of openings, said first valve assembly being in said closed condition when the piston assembly is moved in the compression direction and when the piston is moved in the rebound direction and the pressure differential across the piston plate is below a predetermined level, said first valve assembly being in said open position to permit communication through the first set of openings when the piston assembly is moved in the rebound direction and the pressure differential across said piston plate exceeds said predetermined level, a second valve assembly movable between a closed condition closing said second set of openings when the piston assembly is moved in the rebound direction and in the open condition when the piston assembly is moved in the compression direction, and a bypass passage bypassing said first valve assembly to permit restricted communication of damping fluid through said piston plate when the first valve assembly is in the closed condition and the pressure level across the piston plate is below the predetermined level, said bypass passage comprising a coined depression in the wall forming a valve seat for a valve disc of the first valve assembly to permit fluid flow therethrough under the valve disc with the first valve assembly in its closed condition, the coined depression having a continuously curved cross section.

2. Suspension damper as claimed in claim 1, wherein said continuously curved cross section is an arc of a circle.

3. Suspension damper as claimed in claim 1, wherein said bypass passage is defined by a gap in said rim extending between opposite corners and a continuously curved surface extending into said wall from each of said corners.

4. Suspension damper as claimed in claim 3, wherein said surface is substantially semicircular.

5. Suspension damper as claimed in claim 2, wherein said continuously curved cross section is semicircular.

6. Suspension damper for an automotive suspension system comprising a housing filled with damping fluid, a piston assembly slidable within said housing, said housing and said piston being movable relative to one another in a rebound direction and in a compression direction, said piston assembly including a piston plate having a wall defining a recess communicated to at least one aperture extending through said piston plate, said wall terminating in a rim, a valve member engaging said rim for controlling communication with said recess, and a coined depression in the rim of said wall defining, with the valve member, a bypass passage extending through said wall for permitting restricted communication of damping fluid from said recess when the valve member is engaged with said rim, said coined depression having a continuously curved surface.

7. Suspension damper as claimed in claim 6, wherein said continuously curved surface is an arc of a circle.

8. Suspension damper as claimed in claim 7, wherein said continuously curved surface is semicircular.

9. Suspension damper for an automotive suspension system comprising a housing filled with damping fluid, a piston assembly slidable within said housing, said housing and said piston being movable relative to one another in a rebound direction and in a compression direction, said piston assembly including a piston plate, aperture means communicating damping fluid across said piston plate, a wall defining a recess communicating with said aperture means, valve assembly carried by the piston plate and engageable with said wall for controlling communication through said aperture means, and a coined bypass passage in said wall permitting restricted communication of damping fluid through said piston plate regardless of the condition of the valve assembly, said bypass passage being defined by a continuously curved surface.

10. Suspension damper as claimed in claim 9, wherein said continuously curved surface is an arc of a circle.

11. Suspension damper as claimed in claim 9, wherein said continuously curved is semicircular.

* * * * *